United States Patent Office 3,676,151
Patented July 11, 1972

---

3,676,151
TOASTER PRODUCT AND PROCESS
Rudolph K. Scharschmidt, Battle Creek, Mich., assignor to General Foods Corporation, White Plains, N.Y.
No Drawing. Continuation-in-part of application Ser. No. 873,731, Nov. 25, 1969, which is a continuation of application Ser. No. 798,777, Feb. 12, 1969, which is a continuation-in-part of application Ser. No. 599,984, Dec. 7, 1966, which is a continuation-in-part of application Ser. No. 487,927, Sept. 16, 1965, which in turn is a continuation-in-part of application Ser. No. 303,169, Aug. 19, 1963, all now abandoned. This application Jan. 11, 1971, Ser. No. 105,637
Int. Cl. A21d 13/00
U.S. Cl. 99—86    6 Claims

ABSTRACT OF THE DISCLOSURE

A toaster product has been prepared which is made up of a continuous dough crust containing a fruit filling. Apple powder is used in the fruit filling to provide bulk to the filling and to contribute to the stability of the product which is stored without refrigeration at a moisture content of 13 to 25 percent.

RELATED CASES

This application is filed as a continuation-in-part of U.S. No. 873,731 filed Nov. 25, 1969, which is a continuation of U.S. Ser. No. 798,777 filed Feb. 12, 1969, which is a continuation-in-part of U.S. Ser. No. 599,984 filed Dec. 7, 1966, which is a continuation-in-part of U.S. Ser. No. 487,927 filed Sept. 16, 1965, which is a continuation-in-part of U.S. Ser. No. 303,169 filed Aug. 19, 1963, and the present invention relates to a novel, food-filled breakfast toaster product having an extended shelf life, all now abandoned.

SUMMARY OF THE INVENTION

While many breakfast products are available for the consumer, there has been an absence of an easy-to-prepare toaster product on the market which could fill a need on the breakfast table. Such products, of course, would require an extended shelf storage life in order to be marketed in the usual grocery channels.

It is an object of the present invention to provide a food-filled toaster product which can be prepared for serving merely by placing in a toaster and heating. It is a further object of the present invention to provide a food-filled toaster product having a storage shelf life of at least 6 months. It is yet a further object of the present invention to provide a food-filled toaster product which can be kept at room temperature.

DETAILED DESCRIPTION OF THE INVENTION

The products of the present invention consist of two phases, a filling and a crust surrounding the filling. The dough used to prepare the crust can be formulated according to any of the standard recipes and generally contains about 9–25% fat, about 4–16% sucrose, about 45–60% flour and has a moisture content of about 10–25%. In the preferred embodiment the dough also contains about 1–10% humectant, about ½ to 2% leavening and other optional ingredients such as 0 to about 7% non-fat milk solids, 0 to about 4% active dry yeast and 0 to about 1½% salt. The above percentages are all based on the weight of the dough crust. The filling material has a final moisture content of about 10–25% and contains, as the essential feature of the invention, about 0.5 to 25% apple powder, the above percentages being based on the weight of the filling. The dough crust filling ingredients and their preparation will now be discussed in more detail.

The fat or shortening employed in the dough may be any shortening, although it is preferred to employ a plastic-type shortening. Liquid shortenings may also be employed although somewhat less desirable textural results are obtained. It is preferred to employ a fat level of 8–25% and more preferably 10–18%. At levels of less than 8%, the desired texture is not obtained. At levels over 25%, the product becomes extremely flaky and fragile and does not handle and ship well. The preferred melting point of the plastic shortening employed should be in the order of about 90° F.–112° F.

The humectant employed in the dough may be any humectant which does not impart a stickiness or off-flavor to the final product. Preferably glycerine, sorbitol, corn syrup and like humectants may be employed. The humectants, if used, can be employed at a level of 1–10%, and preferably 3–6% by weight of the dough.

The sugar (sucrose) employed in the dough may be employed at a level of 4–16% by weight of the dough. Preferably, the sugar particle size should range from somewhere in the order of 6X powder to granulated sugar, fine granulated sugar being the preferred particle size. If a particle size finer than 6X sugar is employed, a less desirable texture is obtained.

The flour employed in the dough may be either hard or soft white wheat flour. When hard wheat flour is employed it may be treated with a proteolytic enzyme in order to obtain the most desired texture and a longer shelf life. It is preferred to employ an unbleached flour product at a level of 45–60% by weight of the dough.

A preservative may be employed in the dough to prevent mold growth in order to extend the shelf life of the final product. Typical preservatives would be sorbic acid, benzoic acid, sodium propionate or combinations thereof. Such preservatives would be used at a level of less than 0.5% by weight, and preferably at such level as is required to prevent mold growth.

Active dry yeast may be employed in the dough at a level of 0–4%, and preferably 2% by weight of the dough. While the yeast may be omitted from the dough, it is preferred to employ it in order to obtain the optimum flavor.

If leavening is employed in the dough it may be employed at a level of 0.5%–2%, and preferably 0.9% by weight of the dough. A typical leavening system would be sodium aluminum phosphate and sodium bicarbonate in a ratio of 1:1, or monocalcium phosphate and sodium bicarbonate in a ratio of 2:1. However, any commercial baking powder may be employed as the leavening system in the present invention.

If desired, non-fat milk solids may also be employed to soften or tenderize the dough crust. The non-fat milk solid may be employed at a level of 0–7%, and preferably 2.5% by weight of the dough. At levels greater than about 7%, a product which browns too rapidly upon baking and is not too satisfactory in storage is obtained.

Salt may be employed in the dough at a level of 0–1.5%, and preferably 0.8–1% by weight of the dough.

The dough will also contain sufficient water to maintain a moisture content of 20–35%, and preferably 25–30% prior to processing into the toaster product.

The filling employed in the present invention may be any food product, such as meat, cheese, fruit, vegetable and the like. However, the product employed must have a moisture content which is compatible with the dough crust composition and must be a product which will withstand extended storage periods at room temperatures or above.

Fruit fillings would contain those fruits normally used in pie or pastry products. The fruit would be employed at a level of 20–40%, and preferably 30–37% of the filling on a fresh basis. Dried fruits may be used on an equivalent moisture basis.

Sugar (sucrose) is employed in the fruit filling at a level of 5–35% by weight of the filling. A humectant, such as corn syrup and/or invert syrup is employed in the fruit filling composition. The corn syrup may be employed at a level of 0–15%, and preferably 7–12% by weight of the fruit filling. The invert syrup may be employed at a level of 9–22%, and preferably 15–19% by weight of the fruit filling. The corn syrup and invert syrup act as humectants and also suppress the crystallization of sucrose.

Pregelatinized, degerminated yellow corn flakes (confectionery flakes) may be employed in the fruit filling at a level of 0–8% by weight of the filling. The confectionery flakes act as a filler and add texture to the product. Increasing the level of confectionery flakes above 8% yields a product which is too chewy.

Apple powder is employed in the fruit filling at a level of 0.5–25%, and preferably 0.5–15% by weight of the fruit filling. At levels greater than 15%, apple flavor predominates and is undesirable if the other fruit flavors are desired. However, in the case of grape flavor it is possible to employ an apple powder at levels as high as 25%. Of course, where apple is the desired flavor, apple powder may be the sole fruit constituent. Preferably, the apple powder employed has a particle size of 100% through a No. 10 U.S. Standard Mesh Screen, and 40% through a No. 40 U.S. Standard Mesh Screen. In the case of apple filling, a coarser particle size may be employed. The apple powder serves to absorb moisture, act as a humectant and give a desired fruity flavor. Without the presence of apple powder in the fruit fillings, the product would be gummy and rubbery and would lack the desired textural characteristics. It has been unexpectedly found that the only material which serves to provide these desired properties is apple powder. Strawberry jam when employed as the sole filling migrates into the dough portion of the product leaving sugar crystals and some strawberry pulp, but almost no filling in the center of the product. However, when apple powder is present, there is no migration of the filling into the dough portion of the product. Grape jelly, when used as the sole filling, behaves in a fashion similar to the strawberry jam.

The fruit filling may also contain a humectant such as glycerine, sorbitol and the like at a level of 0–8% by weight of the fruit filling. At levels greater than 8%, the product starts to become too soft and runny and is difficult to handle.

The fruit filling contains sufficient moisture to provide the desired consistency, and preferably a moisture content of about 10–40%, most preferably 15–30% prior to processing into the toaster product.

The dough crust is prepared by first blending all of the dry ingredients, blending in the shortening, and then adding the water. The glycerine may be added before or after the shortening is added. In all cases, the water is added last. The dough containing all of the components is blended until a homogeneous dough is obtained. The dough in homogeneous form is passed through a series of reduction rolls to obtain a dough sheet. Preferably, the sheet will have a thickness of 1/32 to 5/16 inch and most preferably 1/16 inch, although other thicknesses can be used satisfactorily.

In preparing the food filling, all of the materials are dry blended and the liquid-containing materials are then added. In the case of fruit fillings, it is essential to add the apple powder and confectionery flakes after all of the other ingredients have been blended to avoid separation of flavors.

The food filling is deposited on a dough surface and then covered with a top sheet of dough. All of the edges are then sealed by crimping the dough edge to provide the necessary seal. The top dough crust is then punctured to permit escape of steam during baking. While any size food-filled product may be prepared, it is preferred in order that the product be used as a toaster product, that it have dimensions of 3¾ inches x 3¾ inches.

The food filling will preferably have a thickness of 1/16–3/8 inch, and most preferably 1/8 inch, although other thicknesses may be employed.

The product after the dough edges have been sealed is baked at a temperature of 300° F.–425° F. for 20–6 minutes. Preferably a temperature range of 350° F. for 15 minutes to 375° F. for 8 minutes, and most preferably 364° F. for 10 minutes is employed during baking. The product may then be dried if the moisture content is greater than 13–25% after baking. Drying may be carried out using forced hot or cold air. Static air drying may also be employed with controlled humidity. Where hot air is employed, it should be at a temperature of less than 225° F. It is also possible to use temperatures greater than 225° F. provided such temperatures do not increase the degree of brownness in the product. The product after drying is cooled to prevent sweating in the package and then packaged in a moisture-proof package.

The moisture content of the packaged product is about 13–25%, preferably 13–20%, and most preferably 13–17%. Moisture contents in the range of 20–25% are satisfactory provided that it is possible to prepare fillings in which bacterial contamination can be avoided or minimized. Products having moisture contents above 25% are not acceptable because of storage stability problems, such as browning and bacterial decomposition.

The following examples set forth several embodiments of the present invention.

EXAMPLE I

| Dough: | Percent |
|---|---|
| Unbleached soft white wheat flour | 50.00 |
| Water | 16.50 |
| Shortening | 10.00 |
| Granulated sugar | 12.00 |
| Glycerine | 5.45 |
| Non-fat dry milk | 2.00 |
| Yeast | 2.00 |
| Salt | 1.00 |
| Leavening | 1.00 |
| Sorbic acid | 0.50 |
| Filling: | |
| Raspberry | 43.84 |
| Granulated sugar | 13.46 |
| Dextrose | 4.74 |
| Invert syrup | 10.05 |
| Corn syrup | 10.05 |
| Apple powder | 4.74 |
| Confectionery flakes | 9.48 |
| Glycerine | 2.09 |
| Flavor | .95 |
| Vitamins | .13 |
| Citric acid | .47 |
| | 100.00 |

The dough was prepared by combining all of the dry ingredients and blending to obtain a homogeneous mixture. The shortening was added and blended with the dry ingredients to uniformly distribute it. The glycerine was blended in and water was then added and the dough blended and mixed until a homogeneous mixture was obtained. The dough was passed through a series of reduction rolls to reduce it to a thickness of 1/16 inch. The dough was then cut into 3¾ x 3¾ inch squares.

The filling was prepared by dry blending all of the dry ingredients except the confectionery flakes and apple powder. The wet materials were added and uniformly blended with the dry ingredients and thereafter the confectionary flakes and apple powder were added and thoroughly blended with the filling composition.

The filling composition was placed on a 3¾ x 3¾ inch dough square so that a dough margin was left around the perimeter. A second dough square was placed on top of the filling and the dough edges of the top and bottom squares were sealed by crimping. Holes were then punctured in the upper surface and the product was baked in an oven at 365° F. for 10 minutes. The baked product was removed from the oven and was dried to a moisture content of 17% employing forced hot air at a temperature of 210° F. The dried product was permitted to cool to room temperature and then packaged in a substantially moisture-proof package.

EXAMPLE II

The dough composition employed in Example I was used in this example.

| Filling: | Percent |
|---|---|
| Grape concentrate | 34.00 |
| Invert syrup | 22.08 |
| Water | 6.43 |
| Granulated sugar | 10.59 |
| Confectionery flakes | 3.12 |
| Apple powder | 22.72 |
| Flavor | .93 |
| Vitamins | .13 |
| | 100.00 |

The procedure as set forth in Example I was carried out to obtain the final toasted product.

EXAMPLE III

A toaster product was prepared using the dough composition recited in Example I with a filling made from the following composition.

| Ingredient: | Percent |
|---|---|
| Sugar | 21.7 |
| Confectionery flakes | 3.2 |
| Apple powder | 2.5 |
| Starch | 3.2 |
| Dextrose | 7.0 |
| Blueberry concentrate | 21.8 |
| Invert syrup | 17.6 |
| Glycerine | 4.3 |
| Flavor | 0.56 |
| Vitamins | 0.14 |
| Water | 18.0 |

The final toaster product was obtained using the procedure of Example I.

What I claim is:

1. As a toaster product adapted to be packaged in a substantially moisture-proof package a substantially baked, food-filled dough product comprising a continuous dough crust containing within a fruit-flavored filling wherein the product has an average moisture content of 13–25%, the dough crust being derived from a raw dough containing fat, sugar and flour, said fat being present at a level of at least 8% by weight of the dough, the dough having been baked and dried to 10–25% moisture by weight of the dough crust, said baked filling containing 10–25% moisture by weight of the filling, and 0.5% to 25% apple powder by weight of the filling.

2. The product according to claim 1 wherein the apple powder has a particle size of 100% through a No. 10 U.S. Standard Mesh Screen and 40% through a No. 40 U.S. Standard Mesh Screen.

3. The product according to claim 1 wherein the dough contains 8–25% fat, 4–16% sucrose, 45–60% flour, 0.5–2.0% leavening, 0.7% non-fat milk solids, 0.4% active dry yeast, and 0–1.5% salt.

4. The product according to claim 3 wherein the dough contains 1–10% humectant.

5. The product according to claim 3 wherein the dough contains 13–18% fat. 14–16% sucrose, 45–60% flour, 0.5–2.0% leavening, 3–5% non-fat milk solids, 1–3% active dry yeast, 0.8–1.5% salt and wherein the dough has been baked and dried to 13–20% moisture by weight of the dough crust, said bake filling containing 13–20% moisture by weight of the filling.

6. A process for preparing a substantially baked fruit-filled dough product having a continuous dough crust and a fruit-flavored filling therein wherein the product has an average moisture content of 13–25% which comprises mixing flour with sugar and mixing fat and water with said mixture to distribute said fat, the moisture added being sufficient to obtain a dough having a moisture content of 20–30%, the fat being present at a level of at least 8% by weight of the dough, rolling said dough into a crust, placing a fruit-flavored filling on a portion of said dough crust, said fruit-flavored filling containing 10–25% moisture and 0.5–25% apple powder by weight of the filling covering said fruit-flavored filling with a second portion of said dough crust, joining and sealing said first and second dough crusts at their edges to obtain a fruit-filled dough crust product, baking said filled dough crust product at 300°–424° F. for 20–6 minutes, drying said baked fruit-filled dough crust product to obtained an average moisture content therein of 13–25%, cooling said product and packaging said product.

References Cited

UNITED STATES PATENTS

| 1,596,652 | 8/1926 | Giovanneth | 99—86 |
| 1,969,361 | 8/1934 | Frjen | 99—86 |
| 2,060,490 | 11/1936 | Borbely | 99—86 |
| 3,056,678 | 10/1962 | Pentzlin | 99—86 |
| 3,149,979 | 9/1964 | Bohn et al. | 99—92 XR |
| 3,198,637 | 8/1965 | Harris et al. | 9—86 |

FOREIGN PATENTS

| 560,490 | 7/1958 | Canada | 99—7 |

RAYMOND N. JONES, Primary Examiner

U.S. Cl. X.R.

99—171